United States Patent Office 2,852,466
Patented Sept. 16, 1958

---

2,852,466

GREASE COMPOSITIONS WHEREIN THE THICKENER COMPRISES A METAL SALT OF AN N-ACYLAMINOORGANOCARBOXYLIC ACID

Bruce W. Hotten, Orinda, Calif., assignor to California Research Corporation, San Francisco, Calif., a corporation of Delaware No Drawing. Application May 24, 1956
Serial No. 586,927

16 Claims. (Cl. 252—33.6)

This invention pertains to high temperature grease compositions having improved work stability and wear prevention. Furthermore, the high temperature grease compositions herein have improved resistance to oxidation and resistance to emulsification in water.

In the search for grease compositions useful at high temperatures, it was recently believed that grease compositions thickened with such soaps as lithium hydroxystearates were adequate for such services as necessary in the high temperature range of about 300° F. and higher. However, such grease compositions become liquid under extreme conditions of service at high temperatures (e. g., such as when used in roller mill bearings at 300° F. and higher); and such grease compositions also have a higher rate of wear than is desirable.

In selecting a grease for a particular service under extreme conditions of pressure and high temperature, assurance must be had that the grease will maintain its grease characteristics and perform its duties for lubrication over long periods of time, over wide ranges of temperatures, and over wide variations in pressures at the surfaces being lubricated.

When grease compositions tend to become fluid during the period of lubrication, the lubrication characteristic desired becomes lost, resulting in a lubrication failure. For example, a grease thickened with a lithium soap of a hydroxy fatty acid will lose its grease characteristics of work stability and wear prevention under conditions of high temperature and high pressures. The grease composition becomes fluid, flowing away from the surfaces being lubricated, thereby producing lubrication failure. Furthermore, a fluid composition is more susceptible to oxidation at high temperatures than a lubricant which retains its grease structure. Therefore, there is a tendency for the liquid lubricant to become hard and brittle through oxidation, thereby affording no lubrication of the surfaces. In some instances, a liquid lubricant becomes so oxidized that acids are formed, which acids are corrosive to the surfaces to be lubricated.

The grease compositions of the present invention are particularly useful in high temperature aviation and instrument grease compositions; however, the greases are equally effective in sealed bearings of electric motors, sealed bearings of compressors, rocker arms of airplane motors, numerous pieces of high speed equipment, such as high speed motors, steel mill rollers and transfer table bearings, paper mill roller bearings, high temperature cannery equipment, etc.

The term "high melting point" as used herein means melting points from 300° F. and 400° F., and even as high as 500° F. or higher.

The disadvantages in the use of prior art grease compositions as set forth hereinabove have been obviated by the use of grease compositions of the present invention. According to the present invention, it has been discovered that high temperature greases, that is, high melting point grease compositions of high work stability and having excellent wear prevention characteristics, are obtained by the use of metal salts of N-acylaminoalkanecarboxylic acids.

As used herein, the term "metal salts of N-acylaminoorganocarboxylic acids" includes the terms "metal salts of N-acylaminoarylcarboxylic acids"; "metal salts of N-acylaminoalkanecarboxylic acids"; and "metal N-acylaminoalkane carboxylates," as further described hereinbelow.

Metal salts of N-acylaminoorganocarboxylic acids form grease compositions which have greater thermal stability, are more work stable, provide more efficient lubrication, and have greater lubricity than greases thickened with metal salts of fatty acids, such as the lithium salts of hydroxy fatty acids (e. g., lithium hydroxystearate).

As set forth in the following equations, the metal N-acylaminoorganocarboxylates can be prepared by forming a metal salt of the N-acylaminoorganocarboxylic acid obtained by reacting a monocarboxylic acid and a lactam.

(1) 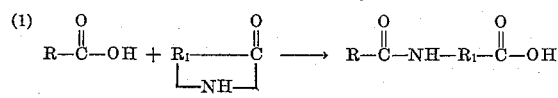

(2) 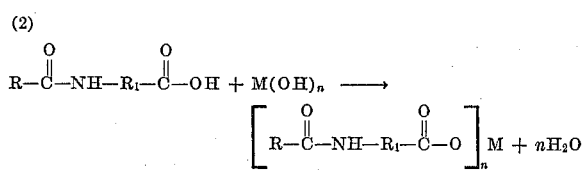

wherein R is a hydrocarbon radical containing from 7 to 21 carbon atoms, $R_1$ is a cyclic or acyclic hydrocarbon radical containing from 4 to 9 carbon atoms, M is a metal, and $n$ represents the valence of the metal. $R_1$ can be an aliphatic radical containing from 4 to 9 carbon atoms, or $R_1$ can be an aryl radical containing from 6 to 9 carbon atoms.

Examples of fatty acids from which can be obtained the radicals designated hereinabove by "R" include octanoic acid, decanoic acid, dodecanoic acid, tetradecanoic acid, hexadecanoic acid, octadecanoic acid, eicosanoic acid, docosanoic acid, etc.

The lactams which can be used in the preparation of the metal N-acylaminoorgano carboxylates include those exemplified as follows:

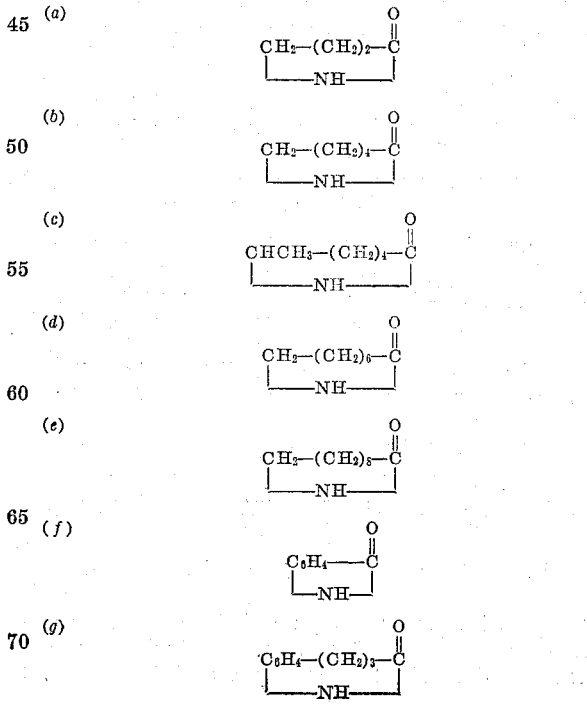

The metals which can be used in the formation of the metal salts of the N-acylaminoorganocarboxylic acids are the metals from groups I and II of Mendeleeff's periodic table. However, it is preferred to use the alkali metals and the alkaline earth metals, such as sodium, potassium, calcium, barium, and strontium.

The grease-thickening agents are exemplified by the alkali metal and the alkaline earth metal salts of N-acylaminoalkanecarboxylic acids, such as N-octanoylaminohexanoic acid, N-decanoylaminohexanoic acid, N-dodecanoylaminohexanoic acid, N-tetradecanoylaminohexanoic acid, N-hexadecanoylaminohexanoic acid, N-octadecanoylaminohexanoic acid, N-eicosanoylaminohexanoic acid, N-docosanoylaminohexanoic acid, N-decanoylaminooctanoic acid, N-octadecanoylaminooctanoic acid, N-eicosylaminooctanoic acid, N-decanoylaminodecanoic acid, N-dodecanoylaminodecanoic acid, N-octadecanoylaminodecanoic acid, etc.; and N-acylaminoarylcarboxylic acids, such as N-decanoylaminobenzoic acid, N-octadecanoylaminobenzoic acid, N-octadecanoylaminotoluic acid, etc.

In the preparation of the N-acylaminoorganocarboxylic acids according to the equations hereinabove, it is preferred that the fatty acid be used in excess of the molar amount sufficient to react with the lactam, in order to avoid polymer formation. The excess acid is then removed following the formation of the fatty acid-lactam reaction product.

Lubricating oils which can be used in the preparation of the grease compositions of this invention include a wide variety of lubricating oils, such as naphthenic base, paraffin base, mixed base, other hydrocarbon lubricants, e. g., lubricating oils derived from coal products, and synthetic oils, e. g., alkylene polymers (such as polymers of propylene, butylene, etc., and mixtures thereof), alkylene oxide type polymers, dicarboxylic acid esters such as dibutyl adipate, dihexyl adipate, di-2-ethylhexyl sebacate, etc.; liquid esters of acids of phosphorus, alkylbenzene polymers including dodecylbenzene, tetradecylbenzene, etc.; polymers of silicon, including the liquid esters of silicon, and the polysiloxanes, such as tetraethyl silicate, tetra(4-ethyl-2-penta) silicate, hexyl(4-methyl-2-pentoxy) disiloxane, poly(methyl siloxane), poly(methylphenyl) siloxane, etc.; alkylene oxide polymers prepared by polymerizing the alkylene oxides such as propylene oxide polymers, etc.

The metal salts of the fatty acid-lactam condensates are used in amounts sufficient to thicken lubricating oils to the consistency of greases; that is, in amounts of 10% to 50%, by weight. However, because of the efficiency of the thickening agents herein, it is preferred to use from 10% to 20%, by weight.

The examples set forth hereinbelow illustrate the preparation of the grease-thickening agents of this invention and the greases therefrom.

EXAMPLE 1.—PREPARATION OF N-OCTADECANOYLAMINOHEXANOIC ACID

A mixture of 284 grams (1.0 mol) stearic acid and 113 grams (1.0 mol) epsilon-caprolactam was heated in a reaction flask with stirring to 230° C., after which the reaction product was cooled to room temperature. The reaction product was crystallized twice from benzene, after which it was washed once with diethyl ether. The dried reaction product was a brown powdery solid having 4.6% nitrogen, and the neutralization number was 126 (i. e., mgs. KOH per gram sample).

EXAMPLE 2.—PREPARATION OF GREASE THICKENED WITH SODIUM N-OCTADECANOYLAMINOHEXANOATE

A mixture of 28.6 grams (0.0625 mol) of the N-octadecanoylaminohexanoate of Example 1 hereinabove and 170 grams of a California naphthenic base oil having a viscosity of 450 SSU at 100° F. was heated with stirring to 250° F., after which the mixture was cooled to 180° F. To this mixture was added 2.5 grams (0.0625 mol) of sodium hydroxide in 15 ml. of water, and the whole admixture was heated with stirring to 325° F. The resulting grease composition (after milling twice through a Manton-Gaulin homogenizer at 4000 p. s. i.) had an ASTM dropping point of 358° F., and an ASTM work penetration (after 60 strokes at 77° F.) of 212.

EXAMPLE 3.—PREPARATION OF N-DODECANOYLAMINOHEXANOIC ACID

A mixture of 200 grams (1 mol) of lauric acid and 113 grams (1 mol) of epsilon-caprolactam was heated with stirring to 250° C. for a period of 2.5 hours, after which the mixture was cooled to room temperature. The resulting product was twice crystallized from benzene, followed by washing with diethyl ether. The resulting product, which was a brown powdery solid, contained 5.83% nitrogen, and it had a neutralization number of 143.

EXAMPLE 4.—PREPARATION OF GREASE THICKENED WITH SODIUM N-DODECANOYLAMINOHEXANOATE

A mixture of 28.4 grams (0.0715 mol) of the N-dodecanoylaminohexanoic acid of Example 3 and 170 grams of a California naphthenic base oil having a viscosity of 450 SSU at 100° F. was heated with stirring to 250° F. The resulting mixture was cooled to 100° F., after which there was added 2.9 grams (0.0715 mol) of sodium hydroxide dissolved in 20 ml. of water. The resulting product was milled through a Manton-Gaulin homogenizer at 3000 p. s. i., then heated to 350° F. After the grease composition had been milled twice through a Manton-Gaulin homogenizer at 400 p. s. i., the resulting grease had an ASTM dropping point of 380° F. and an ASTM worked penetration of 260 (after 60 strokes in the ASTM worker at 77° F.).

As illustrated hereinbelow, N-acylaminoarylcarboxylic acids can be obtained by reacting a fatty acid halide with an amino derivative of an aromatic carboxylic acid.

EXAMPLE 5.—PREPARATION OF PARA-(N-OCTADECANOYLAMINE) BENZOIC ACID 226 grams of stearoyl chloride were added dropwise to a mixture of 100 grams of para-amino benzoic acid, 80 grams of triethylamine, and 750 ml. of dioxane with agitation. The whole mixture was agitated at 158° F. for 0.5 hour, after which 1 liter of water was added. The resulting precipitate was removed by filtration and water washed until it was free of the chloride ion. The reaction product contained 3.4% nitrogen (theory is 3.55%), and the saponification number was 141 (theory is 142). The product melted at 406.5 to 410° F.

EXAMPLE 6.—PREPARATION OF GREASE THICKENED WITH PARA-(N-OCTADECANOYLAMINE) BENZOATE 31.5 grams of the para-(N-octadecanoylamine) benzoic acid of Example 5, hereinabove, were dissolved in 267 grams of a California naphthenic base oil having a viscosity of 450 SSU at 100° F. by heating to 450° F., after which the solution was cooled to 210° F. To this oil solution was added an aqueous solution consisting of 3.1 grams of sodium hydroxide in 10 ml. of water, and the whole mixture was heated to 500° F. The resulting pan-cooled grease was milled. The grease had a dropping point of 500+° F. and a penetration (after 60 strokes in the ASTM worker at 77° F.) of 305.

EXAMPLE 7.—PREPARATION OF GREASE THICKENED WITH LITHIUM PARA-(N-OCTADECANOYLAMINE) BENZOATE 32.5 grams of the para-(N-octadecanoylamine) benzoic acid of Example 5 were dissolved in 267 grams of a California naphthenic base oil having a viscosity of 450 SSU at 100° F. by heating to 450° F. The oil solution was cooled to 210° F., after which there were added 3.4 grams of lithium hydroxide monohydrate in 10 ml. of water. The whole mixture was heated to 500° F., pan cooled, and milled. The resulting grease had a dropping point of 500+° F. and a penetration (after 60 strokes in the ASTM worker at 77° F.) of 359.

In the work stability test described hereinbelow, the ΔP was +21.

EXAMPLE 8.—PREPARATION OF GREASE THICKENED WITH BARIUM PARA-(N-OCTADECANOYLAMINE) BENZOIC ACID 28.2 grams of para-(N-octadecanoylamine) benzoic acid were dissolved in 267 grams of California naphthenic base oil having a viscosity of 450 SSU at 100° F. by heating to 450° F. The oil solution was cooled to approximately 210° F., after which there were added 11.2 grams of barium hydroxide octahydrate in 25 ml. of water. The whole mixture was heated to 500° F., pan cooled, and milled. The resulting grease had an ASTM dropping point of 500+° F. and a penetration (after 60 strokes in the ASTM worker at 77° F.) of 338.

In the work stability test, the ΔP was +2.

Table I hereinbelow further illustrates the characteristics of grease compositions thickened with metal N-acylaminoorganocarboxylic acids.

The base oil used in each instance was a California naphthenic base oil having a viscosity of 450 SSU at 100° F.

For the work stability test data, ASTM worked penetrations (after 60 strokes in the ASTM worker at 77° F.) were obtained on the grease to be tested. The grease was then packed into a No. 206 shield ball bearing. The packed bearing was rotated at 3450 R. P. M. for 30 minutes at room temperature. The ASTM unworked penetration value of the grease at 77° F. was then obtained. The ΔP data of Table I represent the changes in the ASTM worked penetration values obtained before the grease was packed into the bearing, and the ASTM unworked penetration values obtained after the bearing had been rotated.

The ASTM worked penetration was obtained from the ASTM test No. D-217, which is described in the Petroleum Division of the ASTM Manual of Test Procedures. In this test, a perforated disc is plunged through a grease sample for the designated number of strokes (e. g., 60 strokes at 77° F.), after which the penetration value is obtained.

The boiling water test was run by placing a 5-gram sample of grease in boiling water and noting the time at which the grease began to disintegrate. The maximum running time for this test was 60 minutes.

The Timken test is described in "Lubricants and Lubrication" by Clower, published by McGraw-Hill Book Co., 1939, pp. 145–148. The Falex tests are described in the "Journal of the Institute of Petroleum," vol. 32, April 1946.

The Shell roll test is run by placing 75 grams of grease in a Shell roll test apparatus which is described in Military Specification Test MIL–G–10924. However, whereas the MIL–G–10924 test specifies 10 R. P. M. for the apparatus, the data herein were obtained with the apparatus operating at 180 R. P. M. Any grease remaining as a grease for a period of at least four hours is considered to have an excellent work stability.

The mol ratio of the carboxylic acids to the lactam in the preparation of the N-acylaminoalkanecarboxylic acids used in the formation of the thickening agents for Grease Nos. 1, 2, and 3 of Table I was 3:1. The carboxylic acid/lactam mol ratio for Grease Nos. 4 and 5 was 1.5:1. In each case, the reaction product was washed free of excess acid.

Table I

| | Grease Numbers | | | | | |
|---|---|---|---|---|---|---|
| | 1 | 2 | 3 | 4 | 5 | 6 |
| Thickener/Percent by Weight: | | | | | | |
| Sodium N-Dodecanoylaminohexanoate | 15 | | | | 10.5 | |
| Lithium N-Dodecanoylamino hexanoate | | | 15 | | | |
| Barium N-Dodecanoylaminohexanoate | | 15 | | 9.5 | | |
| Lithium N-Decanoylaminohexanoate | | | | | | 15 |
| Properties: | | | | | | |
| Work Stability, ΔP | 0 | −5 | +8 | | | −8 |
| ASTM Worked Penetration | 237 | 220 | 229 | 263 | 269 | 263 |
| ASTM Dropping Point, °F | 356 | 363 | 418 | 354 | 388 | 429 |
| Boiling Water Life, Minutes | | 60+ | 60+ | | | 60+ |
| Shell Roll Test (hours to liquid) | | | | 16+ | 65+ | |
| Falex Test, Steel on Steel, mgs | | | | 5 | 54 | |
| Almen Test, Steel on Bronze, mgs | | | | 0.8 | 9.4 | |

The grease compositions of this invention may also contain oxidation inhibitors (e. g., dihydroxyanthraquinone, metal organodithiophosphates, etc.), rust inhibitors (e. g., metal petroleum sulfonates), lubricity agents (e. g., aromatic phosphates), color correctors, stringiness agents, etc.

I claim:

1. A grease composition comprising a major proportion of an oil of lubricating viscosity and, in an amount sufficient to thicken said lubricating oil to the consistency of a grease, a metal salt of an N-acylamino-organocarboxylic acid selected from the group consisting of N-acylaminoarylcarboxylic acid and N-acylaminoalkanecarboxylic acid, wherein said metal is selected from the group consisting of groups I and II of the periodic table and wherein said acyl group is derived from a fatty acid containing 8 to 22 carbon atoms, said aryl group contains from 6 to 9 carbon atoms, and said alkane group contains from 4 to 9 carbon atoms.

2. A grease composition comprising a major proportion of an oil of lubricating viscosity and, in an amount sufficient to thicken said lubricating oil to the consistency of a grease, a metal salt of an N-acylaminoarylcarboxylic acid, wherein said metal is selected from the group consisting of groups I and II of the periodic table, said acyl radical is derived from a fatty acid containing from 8 to 22 carbon atoms, and said aryl radical contains from 6 to 9 carbon atoms.

3. A grease composition comprising a major proportion of an oil of lubricating viscosity and, in an amount sufficient to thicken said lubricating oil to the consistency of a grease, a metal salt of an N-acylaminoalkanecarboxylic acid, wherein said acyl radical is derived from a fatty acid containing from 8 to 22 carbon atoms, and said alkane radical contains from 4 to 9 carbon atoms, wherein said metal is selected from the group consisting of groups I and II of the periodic table.

4. A grease composition comprising a major proportion of an oil of lubricating viscosity and, in an amount sufficient to thicken said lubricating oil to the consistency of a grease, an alkaline earth metal salt of an N-acylaminoalkanecarboxylic acid, wherein said acyl radical is derived from a fatty acid containing from 8 to 22 carbon atoms, and said alkane radical contains from 4 to 9 carbon atoms.

5. A grease composition comprising a major proportion of an oil of lubricating viscosity and, in an amount sufficient to thicken said lubricating oil to the consistency of a grease, an alkali metal salt of an N-acylaminoalkanecarboxylic acid, wherein said acyl radical is derived from a fatty acid containing from 8 to 22 carbon atoms, and said alkane radical contains from 4 to 9 carbon atoms.

6. A grease composition comprising a major proportion of a mineral lubricating oil and from about 10% to about 20% of a metal salt of an N-acylaminoalkanecarboxylic acid, wherein said acyl radical is derived from a fatty acid having from 8 to 22 carbon atoms, and said alkane radical contains from 4 to 9 carbon atoms, wherein said metal is selected from the group consisting of groups I and II of the periodic table.

7. A grease composition comprising a major proportion of an oil of lubricating viscosity and from about 10% to about 20% of an alkaline earth metal salt of an N-acylaminoalkanecarboxylic acid, wherein said acyl radical is derived from a fatty acid containing from 8 to 22 carbon atoms and said alkane radical contains from 4 to 9 carbon atoms.

8. A grease composition comprising a major proportion of an oil of lubricating viscosity and from about 10% to about 20% of an alkali metal salt of an N-acylaminoalkanecarboxylic acid, wherein said acyl radical is derived from a fatty acid containing from 8 to 22 carbon atoms and said alkane radical contains from 4 to 9 carbon atoms.

9. A grease composition comprising a major proportion of an oil of lubricating viscosity and from about 10% to about 20% of a barium salt of an N-acylaminoalkanecarboxylic acid, wherein said acyl radical is derived from a fatty acid containing from 8 to 22 carbon atoms and said alkane radical contains from 4 to 9 carbon atoms.

10. A grease composition comprising a major proportion of an oil of lubricating viscosity and from about 10% to about 20% of a sodium salt of an N-acylaminoalkanecarboxylic acid, wherein said acyl radical is derived from a fatty acid containing from 8 to 22 carbon atoms and said alkane radical contains from 4 to 9 carbon atoms.

11. A grease composition comprising a major proportion of a hydrocarbon oil and from about 10% to about 20% of sodium N-dodecanoylaminohexanoate.

12. A grease composition comprising a major proportion of a hydrocarbon oil and from about 10% to about 20% of lithium N-dodecanoylaminohexanoate.

13. A grease composition comprising a major proportion of a hydrocarbon oil and from about 10% to about 20% of barium N-dodecanoylaminohexanoate.

14. A grease composition comprising a major proportion of a mineral lubricating oil and from about 10% to about 20% of a metal salt of an N-acylaminoarylcarboxylic acid, wherein said acyl radical is derived from a fatty acid having from 8 to 22 carbon atoms, and said aryl radical contains from 6 to 9 carbon atoms, wherein said metal is selected from the group consisting of groups I and II of the periodic table.

15. A grease composition comprising a major proportion of a hydrocarbon oil and from about 10% to about 20% of sodium para-(N-octadecanoylamine) benzoate.

16. A grease composition comprising a major proportion of a hydrocarbon oil and from about 10% to about 20% of barium para-(N-octadecanoylamine) benzoate.

References Cited in the file of this patent

UNITED STATES PATENTS

| | | |
|---|---|---|
| 2,104,641 | Green | Jan. 4, 1938 |
| 2,604,449 | Bryant | July 22, 1952 |
| 2,702,820 | Tummes et al. | Feb. 22, 1955 |
| 2,752,312 | Dixon | June 26, 1956 |
| 2,756,213 | Dixon | July 24, 1956 |